United States Patent [19]
Damsohn et al.

[11] Patent Number: 5,338,253
[45] Date of Patent: Aug. 16, 1994

[54] FILTER FOR AN AIR-CONDITIONING OR HEATING SYSTEM FOR A MOTOR VEHICLE

[75] Inventors: Herbert Damsohn, Aichwald; Walter Wolf, Oppenweiler, both of Fed. Rep. of Germany

[73] Assignee: Behr GmbH & Co., Fed. Rep. of Germany

[21] Appl. No.: 802,490

[22] Filed: Dec. 5, 1991

[30] Foreign Application Priority Data

Dec. 16, 1990 [DE] Fed. Rep. of Germany ........ 4040104

[51] Int. Cl.$^5$ .............................................. B60H 3/06
[52] U.S. Cl. .......................................... 454/158; 96/154
[58] Field of Search ................ 454/139, 158; 55/316, 55/387

[56] References Cited

U.S. PATENT DOCUMENTS

| | | | |
|---|---|---|---|
| 2,655,091 | 10/1953 | Geiger | 454/158 |
| 3,925,248 | 12/1975 | Moroni et al. | 55/387 X |
| 4,046,939 | 9/1977 | Hart | 55/387 X |
| 4,099,944 | 7/1978 | Davis | 55/502 X |
| 4,737,173 | 4/1988 | Kudirka et al. | 55/316 X |

FOREIGN PATENT DOCUMENTS

| | | |
|---|---|---|
| 2165739 | 12/1979 | Fed. Rep. of Germany . |
| 3207511 | 9/1983 | Fed. Rep. of Germany . |
| 3441918 | 4/1986 | Fed. Rep. of Germany . |
| 8717296 | 8/1988 | Fed. Rep. of Germany . |
| 8813571 | 6/1989 | Fed. Rep. of Germany . |
| 3839352 | 5/1990 | Fed. Rep. of Germany . |
| 3842994 | 7/1990 | Fed. Rep. of Germany . |
| 3904623 | 8/1990 | Fed. Rep. of Germany . |
| 147615 | 8/1984 | Japan ...................... 55/316 |
| 2206295 | 1/1989 | United Kingdom ................ 55/316 |

*Primary Examiner*—Harold Joyce

[57] ABSTRACT

In the case of a filter for an air-conditioning or heating system for a motor vehicle, it is provided that the filter body is formed of a material which is arranged in several layers and is coated with an adsorption agent and, at least on its air outlet side, is covered with an air-permeable textile flat shaped structure.

10 Claims, 1 Drawing Sheet

FILTER FOR AN AIR-CONDITIONING OR HEATING SYSTEM FOR A MOTOR VEHICLE

BACKGROUND AND SUMMARY OF THE INVENTION

This invention relates to a filter for an air-conditioning or heating system for a motor vehicle, having a filter body made of a material arranged in several layers with open pores which are coated with a granular adsorption agent, particularly activated-carbon granules.

In the case of a known filter of the initially mentioned type (German Patent Document DE-U 87 17 296.8), the filter body, which is formed of three layers, is placed in a frame.

In the case of another construction of a multi-layer filter (European Patent Document EO-A 0 162 922), it is provided that the filter elements are arranged in a housing made of cardboard or plastic which is arranged in an air duct or the like with the insertion of an elastic sealing material.

It is also known (German Patent Document DE-C 34 41 918) to provide a plate-shaped filter insert with a frame which has an improved sealing to a filter housing. For this purpose, the frame is surrounded by an edge bordering made of a foamed elastic plastic material which reaches around the filter insert in the edge area. The plastic material, which foams during the manufacturing process, assumes the desired shape into the area of the web-shaped filter cloth.

It is also known (German Patent Document DE-A 38 39 352) to mold a frame to the multi-layer filter body in such a manner that the material of the edge penetrates into the edge of the filter body down to a predetermined depth. This results in a very good sealing with respect to the frame so that a filter is created which is used as an odor filter and which is suitable for an air-conditioning system of motor vehicles.

It is an object of the invention to improve a filter of the initially mentioned type.

This object is achieved in that the filter body, at least on its air outlet side, is covered by an air-permeable textile flat shaped structure in which the distances between the yarns are smaller than the outer dimensions of the granular adsorption agent.

The textile flat shaped structure, which may be a woven or knitted fabric, on the one hand, has the result that the multi-layered filter body is further stabilized while, on the other hand, the important advantage is obtained that this textile flat shaped structure retains adsorption agent which may possibly separate from the multi-layered filter body because of vibrations or the like. As a result, it is avoided that this granular adsorption agent, particularly activated-carbon granules, can reach the vehicle interior and cause dirt there and/or otherwise annoy the vehicle occupants.

In a further development of the invention, it is provided that the textile flat shaped structure surrounds the filter body in the manner of a stocking. This ensures that any adsorption agent is held back inside the filter while the textile flat shaped structure at the same time holds the whole filter body together so that it exists as a preformed constructional unit.

In a further development of the invention, it is provided that the edges of the textile flat shaped structure are shaped into a frame molded onto the filter body.

In another embodiment, it is provided that the edges of the filter body, together with the textile flat shaped structure, are clamped into a frame or shaft which is preferably formed by a housing. During this clamping-in, the edges of the filter body are pressed together so that here also a secure sealing is obtained which has the result that the filter may be used as a large-sized filter.

In a further development of the invention, it is provided that the reinforcing mesh is manufactured from a plastically deformable material, particularly metal. As a result, it is possible to adapt the filter body made of several layers of filter material and the reinforcing mesh to given spatial conditions by means of a plastic deformation.

In a further development of the invention, it is provided that the reinforcing mesh is arranged in parallel to the layers and is provided with spikes penetrating into at least the connecting layers. The reinforcing mesh with the spikes and the additional covering with the woven or knitted fabric has the result that the filter body has a relatively high rigidity so that it can be handled in a simple manner and mainly also without any danger of damage and/or any danger of a shifting of the layers with respect to one another.

Other objects, advantages and novel features of the present invention will become apparent from the following detailed description of the invention when considered in conjunction with the accompanying drawings.

DETAILED DESCRIPTION OF THE DRAWINGS

Figure 1:
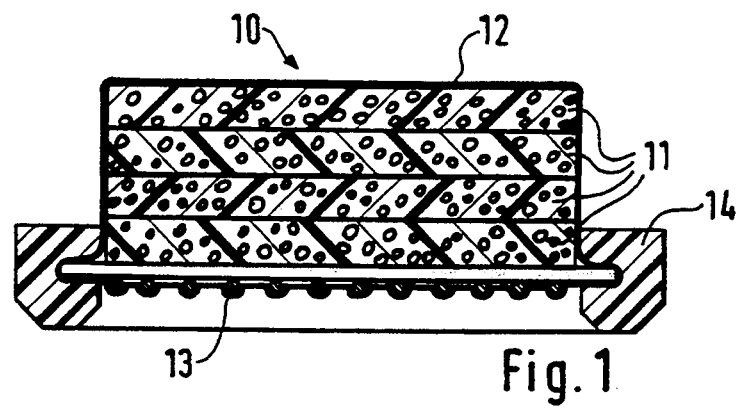
FIG. 1 is a cross-sectional view of a filter which is provided with a molded-on frame which is applied to a reinforcing mesh, constructed according to a first preferred embodiment of the invention.

The filter 10 illustrated in FIG. 1 comprises four layers 11 which are each formed of plates cut out of a polyurethane foam. The polyurethane foam has open pores which measure approximately 10 ppi to 30 ppi (pores per inch). In the area of the pores, the plates are coated with an adsorption agent, particularly with activated-carbon granules. The filter body, which is formed of the plate-shaped layers 11, may have any basic shape, for example, a round or a rectangular basic shape. The filter body made of plates 11 is surrounded by a textile flat shaped structure 12 in the manner of a stocking which may be formed of a woven or knitted fabric. This textile flat shaped structure 12 consists of yarns which maintain a distance from one another which is smaller than the outer dimensions of the granular adsorption agent. As a result, it is prevented that activated-carbon granules, which may possibly detach from the pores of the plate-shaped filter material, are carried out of the area of the filter 10.

On the air outlet side, the filter 10 is covered by a reinforcing mesh 13. The reinforcing mesh 18 is also surrounded by the textile flat shaped structure 12. However, as a modification of the shown embodiment, it may also be provided that the reinforcing mesh is disposed on the outside on the textile flat shaped structure 12. It is also contemplated to arrange a comparable reinforcing mesh on the air inlet side, or to arrange reinforcing meshes on both sides.

As indicated in FIG. 1, the reinforcing mesh 13 projects on all sides beyond the basic surface of the filter body which is formed of the layers 11 and is surrounded by the textile flat shaped structure 12. In this area, the filter body is provided with a molded-on, for example, sprayed-on frame 14 which extends along part of the height of the filter body so that a secure sealing-off of the filter body is achieved with respect to the frame 14. The frame 14 may be made of a soft elastic material so that the filter as a whole is flexible. The reinforcing mesh 13, which may, for example, be a metallic rib mesh or a plastic part, is also elastically or plastically deformable while it nevertheless causes a certain dimensional stability for the whole filter.

Figure 2:
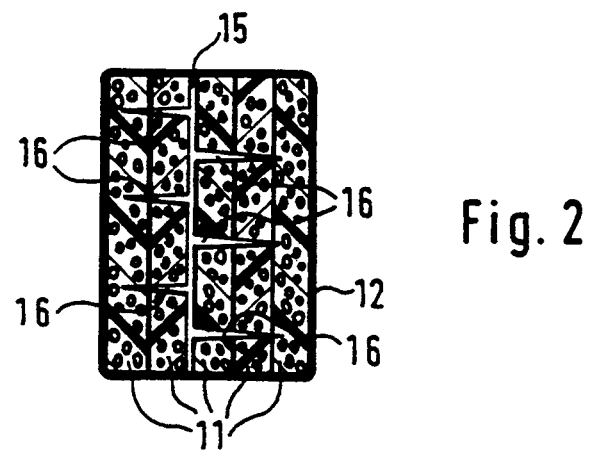
FIG. 2 is a cross-sectional view of a filter body with an interior reinforcing mesh which is provided with spikes penetrating into the layers of the filter body, constructed according to a second preferred embodiment of the invention.

In the case of the embodiment according to FIG. 2, the filter body comprises a total of five layers 11 which are also cut as plates out of polyurethane foam. Between these plates, a reinforcing mesh 15 is arranged which is arranged in parallel to the layers 11 and which is provided with spikes 16 which project toward both sides and which penetrate into the layers 11 in the manner of needles. This filter body is again surrounded by a textile flat shaped structure 12, that is, by a woven or knitted fabric. This filter body, which is formed of the layers 11 and the mesh 15 as well as of the stocking-type textile flat shaped structure 12, forms a structural unit which can be transported separately since the textile flat shaped structure 12 as well as the reinforcing mesh 15 with the spikes 16 provide sufficient stability. When relatively stiff yarns are used for the textile flat shaped structure 12, which may also consist of thin metal wires, this textile flat shaped structure alone may provide sufficient inherent stability. In addition, the textile flat shaped structure 12 may also be wound around the filter body with tension and may be glued or welded or similarly attached to it on its edge areas.

Figure 3:
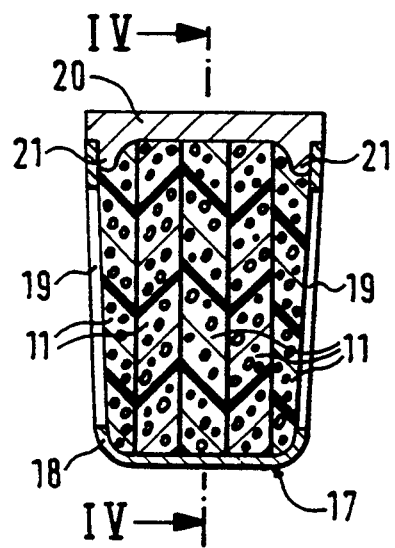
FIG. 3 is a cross-sectional view taken along line III—III of FIG. 4 of a filter body inserted into a shaft or a frame of a housing and in the process deforming in the edge area, constructed according to a further preferred embodiment of the invention.
Figure 4:
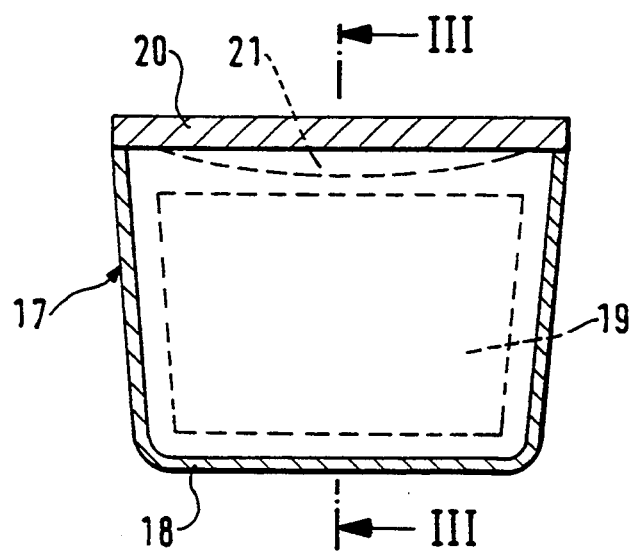
FIG. 4 is a sectional view along line IV—IV of FIG. 3.

A filter body comprising several layers 11, which is surrounded by a textile flat shaped structure 12, for example, a filter body with or without a reinforcing mesh according to FIG. 2, corresponding to FIGS. 3 and 4, is inserted into a shaft 17. The shaft 17 has a bottom part 18, the longitudinal sides of which are provided with window-type breakthroughs 19. The lateral walls and the frontal walls of this bottom part 18 taper from the open side to the closed side so that the filter body formed of the layers 11, when it is introduced into the shaft or housing 17, is compressed and deformed in the edge area so that a secure sealing is obtained in the edge area while by-pass openings are avoided. The open side of the bottom part 18 is closed off by a lid 20 which penetrates into the bottom part 18 by means of surrounding webs 21 which have their largest height in the center. As a result, the filter material of the outer edges of the layers 11 is compressed also in this area so that there also a secure sealing is obtained. In the case of a modified embodiment, the inner circumferential surfaces of the shaft or housing 17 and possibly also the interior surface of the lid 20 are provided with grooves or ribs so that an effect is obtained which is similar to the effect of a labyrinth seal.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A filter for an air-conditioning or heating system for a motor vehicle, comprising:
   a filter body made of a material arranged in several layers with open pores which are coated with a granular adsorption agent; and
   an air-permeable textile flat shaped structure formed of yarns covering only outer surfaces of the filter body at least on its air outlet side,
   wherein the distances between the yarns of the textile structure are smaller than the outer dimensions of the grains of the granular adsorption agent.

2. A filter according to claim 1, wherein said granular adsorption agent is activated-carbon granules.

3. A filter according to claim 1, wherein the textile flat shaped structure surrounds the filter body in the manner of a stocking.

4. A filter according to claim 1, wherein edges of the textile flat shaped structure are molded into a frame which is molded to the filter body.

5. A filter according to claim 1, wherein edges of the filter body, together with the textile flat shaped structure, are clamped into a shaft or housing.

6. A filter according to claim 1, wherein a reinforcing mesh is provided for the filter body.

7. A filter according to claim 6, wherein the reinforcing mesh is made of a plastically deformable material.

8. A filter according to claim 7, wherein the plastically deformable material is metal material.

9. A filter according to claim 7, wherein the reinforcing mesh is arranged in parallel to the layers and is provided with spikes penetrating into at least two connecting layers.

10. A filter according to claim 8, wherein the reinforcing mesh is arranged in parallel to the layers and is provided with spikes penetrating into at least two connecting layers.

* * * * *